United States Patent [19]

Davey

[11] Patent Number: 5,636,270

[45] Date of Patent: Jun. 3, 1997

[54] METHOD OF PRODUCING SIGNALS COMMONLY USED WITH TELEPHONES

[76] Inventor: Melville G. Davey, Box 212, Swansea, Mass. 02777

[21] Appl. No.: 430,179

[22] Filed: Apr. 27, 1995

Related U.S. Application Data

[63] Continuation-in-part of Ser. No. 175,600, Dec. 30, 1993, abandoned.

[51] Int. Cl.⁶ .................................................. H04M 1/27
[52] U.S. Cl. ........................... 379/352; 379/67; 379/355; 379/350; 379/361; 381/190
[58] Field of Search .............................. 379/355, 144, 379/357, 99, 444, 88, 361, 375, 373, 374, 418, 429, 386, 352, 350; 381/190, 157

[56] References Cited

U.S. PATENT DOCUMENTS

| | | | |
|---|---|---|---|
| 4,126,768 | 11/1978 | Grenzow | 379/357 |
| 4,339,632 | 7/1982 | Early et al. | 379/355 |
| 4,490,579 | 12/1984 | Godoshian | 379/360 |
| 4,598,179 | 7/1986 | Clark et al. | 379/200 |
| 4,656,651 | 4/1987 | Evans et al. | 379/88 |
| 4,677,657 | 6/1987 | Nagata | 379/144 |
| 4,817,135 | 3/1989 | Winebaum | 379/355 |
| 4,920,556 | 4/1990 | Wong | 379/374 |
| 4,969,197 | 11/1990 | Takaya | 381/190 |
| 4,979,171 | 12/1990 | Ashley | 379/88 |
| 4,980,910 | 12/1990 | Oba et al. | 379/355 |
| 4,995,077 | 2/1991 | Malinowski | 379/355 |
| 5,034,977 | 7/1991 | Yam-Chern et al. | |
| 5,063,589 | 11/1991 | Takshima | |
| 5,081,672 | 1/1992 | Mita et al. | |
| 5,127,004 | 6/1992 | Lenihan et al. | 379/88 |
| 5,157,712 | 10/1992 | Wallen, Jr. | 379/74 |
| 5,181,744 | 1/1993 | Betheil | 379/355 |
| 5,182,767 | 1/1993 | Bernard | 379/355 |
| 5,208,852 | 5/1993 | Tamura et al. | |
| 5,210,790 | 5/1993 | Lin | 379/368 |
| 5,274,701 | 12/1993 | Schmidt et al. | 379/375 |
| 5,307,059 | 4/1994 | Connary et al. | 379/374 |
| 5,481,599 | 1/1996 | MacAllister et al. | 379/374 |
| 5,483,577 | 1/1996 | Gulick | 379/88 |

*Primary Examiner*—Krista M. Zele
*Assistant Examiner*—Daniel S. Hunter

[57] ABSTRACT

This invention describes a universal method of producing a plurality of analog telephone signal types, commonly used repeatedly, with telephone peripheral, terminal and central office equipment, using a single means. Signal types include dual tone multi-frequency (DTMF), dial tone, voice prompt, voice message, busy tone, ring back tone, frequency shift key (FSK), fax and modem, to name a few of the most common. The invention describes specific telephone devices and systems that are made more versatile by, or possible by, the application of this analog telephone signal production method. One such device is an acoustically coupled telephone automatic dialing device (ACTADD) in which the application of this analog telephone signal production method results in an extremely compact and versatile product. The invention further describes a solution for reliable acoustic coupling, as well as certain user friendly features for an ACTADD. Another device described is an enhanced capability "smart phone"/answering machine with caller controlled calling party identification (CPID) capabilities, using no synthesized tone dialer chips, nor any modem FSK circuitry usually associated with such capabilities. The invention further describes how this analog telephone signal production method can be used in a telephone central office, to provide a single source for most required analog telephone signal types, and the ability to customize these signals to suit a subscribers' particular needs.

10 Claims, 7 Drawing Sheets

METHOD OF PRODUCING SIGNALS COMMONLY USED WITH TELEPHONES

This is a continuation-in-part of application Ser. No. 8/175,600, filed Dec. 30, 1993, now abandoned.

BACKGROUND—FIELD OF THE INVENTION

This invention relates to a universal method for the production of analog signals used in telephone communication to convey information or control systems. These signal types include dual tone multi frequency (DTMF) signals used for dialing and other signaling, busy tones, voice messages, modem signals, dial tones, fax signals and others.

BACKGROUND—DESCRIPTION OF PRIOR ART

All analog telephone signal types excepting voice have been previously produced using electronic tone generators of one sort or another. Voice signals such as voice prompts: "I'm sorry, your call did not go through; please hang up and dial again." or "Thank you for using AT&T." are produced from electronic voice recorders or synthesizers or concatenators. In telephone company central office (CO) equipment, telephone units, answering machines and peripheral devices such as modems or dialing cards, these multiple methods of producing signals almost always result in reduced capabilities or a multiplicity of electronic means to provide all of the capabilities. Such electronic tone generators in current equipment are usually integrated circuits (IC's) with associated external electronic components.

These tone generators are generally specialized oscillators. Each tone type is the result of a dedicated device for producing that tone. For instance, Malinowski U.S. Pat. No. 4,995,077, FIG. 3, Device 34, referred to as a "microprocessor or dialer chip", shows a device known in the art for producing dual tone multi frequency (DTMF) signals from a single LSI circuit. Lin U.S. Pat. No. 5,210,790, FIG. 5, expands on this example, to show the internal workings of a tone producing portion of a tone dialer chip. This technique of producing dual tones is known in the art as frequency synthesis and forms the basis of operation of most currently used electronic tone generating devices. Frequency synthesis is the process of starting with a much higher than needed oscillator frequency and dividing that signal frequency down to the appropriate rate. Each synthesized signal type usually requires a single IC circuit chip dedicated to its production.

Tamura et al in U.S. Pat. No. 5,208,852, for Seiko Epson Corp., for example, shows us in FIG. 2, a prior art telephone system containing three different IC chips for producing three different analog telephone signal types: a dial chip for DTMF signals, a melody chip for "hold" tones, and a ring tone generation circuit for an annunciator signal. The patent claims a configuration for generating two of these tones, the "hold" tone (melody chip) and the DTMF tones, in a single LSI circuit, and points up the need to eliminate chips for cost reduction and simplicity of assembly. Yarn-Chern Chen, Nan-tou, et al, for Industrial Technology Research Institute, U.S. Pat. No. 5,034,9 describes an alternate synthesis process called phase accumulation for producing DTMF signals. They rightly point out that this signal production method results in greater frequency accuracy. For example, the dual tone for dialing the digit "3", the CCITT standard oscillator frequency for this digit is 697 Hz and 14 Hz. The Tamura synthesis method, using a standard oscillator frequency of 3,579,545 MHz, produces frequencies of 699.1 Hz and 1471.9 Hz for this digit. The Nan-tou method uses a lower frequency oscillator and can exactly produce the CCITT standard. Here again, though: one chip, one signal type.

While this signal generation technique is adequate in many applications, especially those where only a single analog telephone signal type is needed, the technique becomes cumbersome in state of the art equipment, where numerous signal types are required. For instance, a telephone answering machine might require a dialer chip to produce DTMF signals, a separate speech recorder/playback chip to record messages and provide outgoing messages, a separate hold melody IC chip and a separate ring tone annunciator chip as deskbed above. An enhanced capability telephone and answering machine/data transmission system, known as an enhanced "smart phone", might further incorporate data transmission chips for FSK (frequency shift key) signals. Each added capability requires a separate tone generation circuit.

For instance, Mita et al, U.S. Pat. No. 5,081,672 for Sony Corp. and Takshima, U.S. Pat. No. 5,063,589, for Tandy Electronics Japan, Ltd. both describe answering machines having multiple capabilities, and demonstrate the complexities of equipment resulting. Betheil, U.S. Pat. No. 5,181,744 describes an acoustically coupled telephone auto dialing device (ACTADD). While this device is simple in itself, with its emphasis on promotional and advertising advantages, it provides for no voice message capability to accompany the dialing tones. The voice message would seem crucial for a promotional ACTADD to be commercially successful.

Nagata, for instance, in U.S. Pat. No. 4,6,657 for Omron Tateisi Electronics Co., shows a voice recording card, for recording and reproducing voice messages and transmitting them over telephone lines, but doesn't show any capability for dialing a phone or storing DTMF analog signals.

SUMMARY

Accordingly, it is the object of this invention to demonstrate an improved method of producing a plurality of analog telephone signal types, in which:

all of the tone generating means normally associated with telephone equipment, CO operations and peripheral devices, can be replaced by a method of tone production, using a single means.

that tone production means can also be used to produce voice signals.

that tone production and voice signal means can also be used to produce data signals such as modem, FSK and DTMF.

that tone production, voice and data signal means can also be used to produce annunciation signals.

that tone, voice, data, and annunciator signal production means can also be used to produce other analog telephone signal types not heretofore thought practical or deemed necessary.

a variation of that tone, voice, data and other analog telephone signal type production means can be controlled by an OEM user, and to a lesser extant by an end user, to provide custom tones, voice, FSK, modem and other analog telephone signal types.

that tone production means will result in signals of greater frequency accuracy.

It is a further object of this invention to demonstrate the practicality and feasibility of using this means in specific apparatus, showing the enhanced versatility, simplicity and economics that result.

For instance, the tone synthesizer chip in the auto dialer device as described by Betheil in patent No. 5,181,744, could be replaced by a single LSI circuit means with stored DTMF signals to dial a number and with a stored voice message such as "Thank you for calling ABC Company, your business is welcome". This increased capability could result without adding cost or complexity.

The method of producing these signals will hereinafter be known as a Produced Analog Telephone Signal (PATS) method, and the mechanisms for effecting the method will be known as PATS Means.

In another example, in a telephone company central office switching network exists one of the most complex of telephone signaling systems. While it is beyond the scope of this application to fully describe such a system, and how this signal production method would apply in specific operational circuit terms, one skilled in the art of the operation of a central office, particularly line cards, will certainly appreciate the elegance, simplicity and economy that would result from using a PATS Means. That is, all signals necessary to a single subscriber local loop, including voice, can be contained in a single storage and retrieval means dedicated to that single subscriber alone. These signals would include, but not be limited to dial tone, busy signal, ring feedback, and voice prompts. In addition, a PATS Means results in interactive capability. It would provide for the storage of a dialed incoming DTMF signal sequence, immediately, as dialed, for retrieval and processing as soon as the switching network is ready. It would facilitate a caller ID system by providing a stored loop subscriber ID signal on demand, for forwarding to the called telephone. And it could act as a voice message storage center for special feature telephone loops. This single analog telephone signal production means could further provide personalized call waiting signals, rather than the obtrusive "click-click" we now get. For instance, the signal could be a pleasant two tone chime melody followed by a voice message, such as, "Mr. Jones, you have a call waiting on line two".

All of these central office signal types would be stored using a single PATS Means in combination with a microprocessor. The microprocessor addresses and controls the PATS Means for storing and producing the particular signal needed. The methods employed for this Central Office application will become evident from less complex demonstrations detailed below.

It is, therefore, a further object of this invention:

to demonstrate through the example of an enhanced capability "smart phone", how a PATS Means can be used, in conjunction with a microprocessor, to provide voice signal recording capability and to produce a plurality of analog telephone signal types, thereby eliminating various tone generation circuits and increasing "smart phone" capabilities.

to provide an improved acoustically coupled telephone auto dialer device (ACTADD) using a PATS Means.

to teach the construction and operation of this ACTADD, using a PATS means;

to demonstrate how this ACTADD can be used in a multiplicity of applications depending upon the type and sequence of signals stored into the device.

Devices of this type, for automatically dialing a telephone, usually take the form of a credit card size assembly. All known such devices rely on a tone generator to synthesize the DTMF signal needed for dialing, and have no other signal type producing capability. From a review of prior art Pat. Nos.: Betheft U.S. Pat. No. 5,181,744; Bernard U.S. Pat. No. 5,182,767; Malinowski U.S. Pat. No. 4,995,0, and from a review of commercially available devices, those that have operated successfully tend to be thick (¼" or more) and not the thin pocket devices desired. This thickness has resulted from the need to use some type of bulky dynamic speaker as the acoustic transducer, to broadcast the DTMF signal sequence into the telephone mouthpiece (microphone). While Betheil U.S. Pat. No. 5,181,744, and Malinowski U.S. Pat. No. 4,995,0, both mention thin ceramic disc or piezoelectric acoustic transducer devices as possibilities, neither demonstrates how to make a piezoelectric device operate reliably as the acoustic transducer. Since signal waveform for dialing a telephone is critical, it is essential that the acoustic transducer in an auto dialer have an appropriate frequency response over the audio spectrum being used, and that it not produce any harmonic signals in this spectrum. Other conditions, such as position and contact between auto dialer and telephone mouthpiece, can adversely affect this performance as well. Consequently, observed devices have relied on resilient padding and alignment bumpers to isolate the acoustic transducer from contact with the telephone mouthpiece, and to provide an exact positioning. The net result has been that reliable auto dialers have not met the thin (2.5 mm or less) requirement for carrying in the pocket or billfold, and consequently have not realized the commercial success that is possible.

It is therefore a further object of this invention:

to teach a method of mounting a thin piezoelectric acoustic transducer within a thin credit card-like module, which can be used reliably to acoustically couple dialing and other analog telephone signals to the telephone line, without regard to contact or exact positioning over the telephone mouthpiece.

Yet further objects of this invention are:

to outline how a PATS Means can be used effectively by a telephone company central office (CO), in association with a single subscriber line, to simplify equipment, improve service, customize service and render service less expensive.

to teach how the production of analog telephone signals using the PATS method can result in a variety of useful and not heretofore demonstrated functions.

In summary, the present invention shows a universal method of producing a broad class of analog telephone signal types from a single means, and presents through description and specific examples, the beneficial results of using this signal production method.

Further objects, advantages and applications will become apparent from a consideration of the ensuing description and drawings.

Reference Numerals in Drawings 10 Analog Telephone Signal Sources

11 Signal In Conditioning Circuit
12 Signal Storage Medium
13 Signal Out Conditioning Circuit
14 Control Logic Circuit
15 Control Functions
17 PATS Means
20 Acoustic Transducer
21 1-n Playback Switches
22 LSI PATS Means
23 Programming Pads A–F
24 Charging Resistor
25 Pull Up Resistor 26 Pull Up Resistor
27 1-N Isolation Diodes
29 Pull Down Diode
31 Discharge Resistor
32 Storage Capacitor
33 Bypass Capacitor
34 Pull Up Resistor
35 Pull Up Resistor
36 Pull Up Resistor
37 Pull Down Resistor
38 Transistor
39 Light Emitting Diode (LED)
40 Light Emitting Diode (LED)
41 Battery
42 Feedback and Current Limit Resistor
50 Bottom Adhesive Label
51 Through Hole
52 Circuit Board
54 Spacer Ring
55 Contact Elements
56 Mylar-like Material
59 Circuit Board Etched Surface
60 Plastic Spacer
61 Top Surface Label
63 Hook Switch
64 Hand Set
66 Manual Inputs
67 Microcontroller
68 Control Buss
70 Call Progress Detection
72 Audio Buss
73 Speech Network
74 Data Access Arrangement (DAA)
75 Speaker
76 Analog Switch
78 Address Bus
80 PATS Means

DESCRIPTION OF THE PREFERRED EMBODIMENTS

Figure 1A:
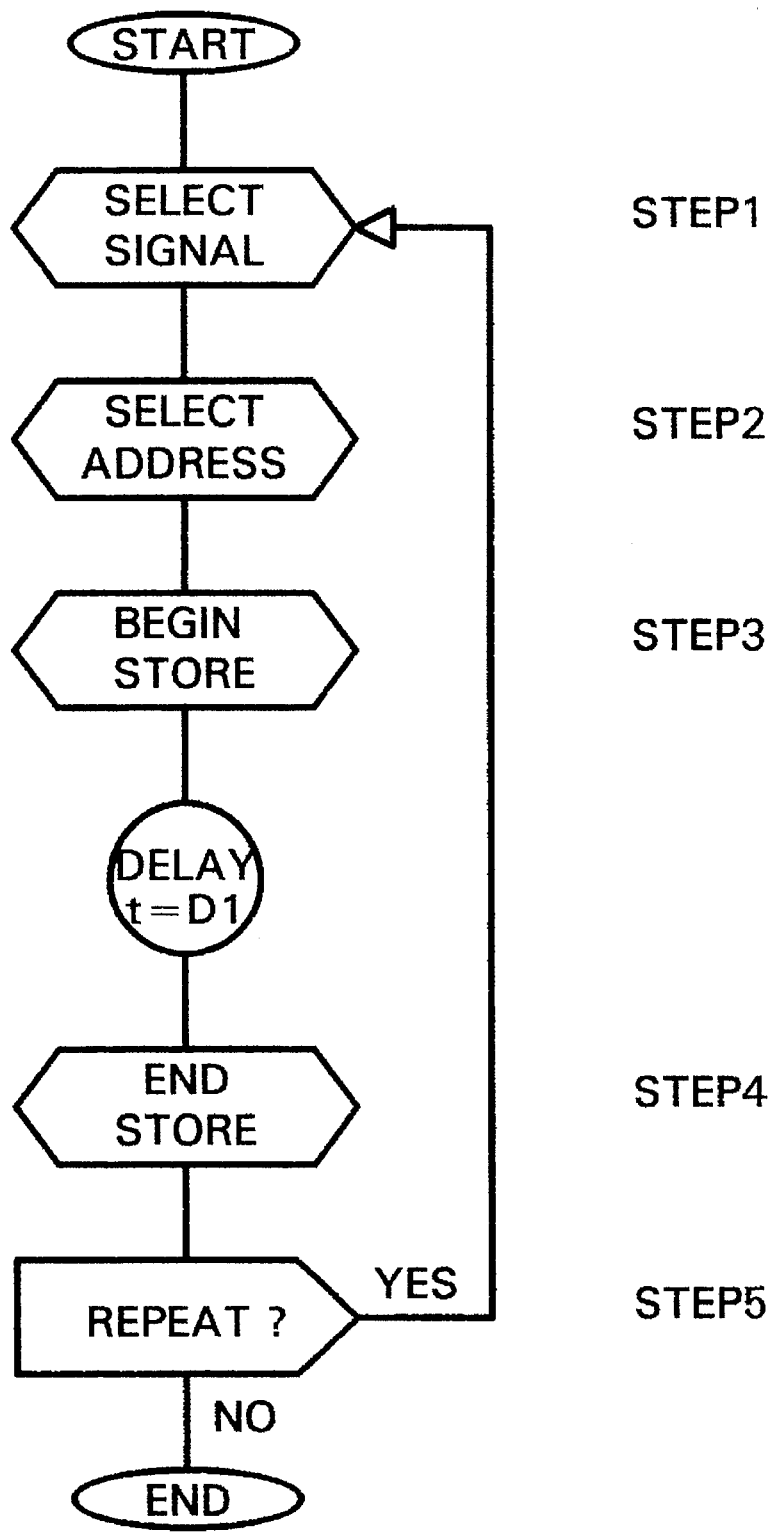
FIG. 1A—Event Block Diagram Flow Chart—Storage Sequence
Figure 1B:
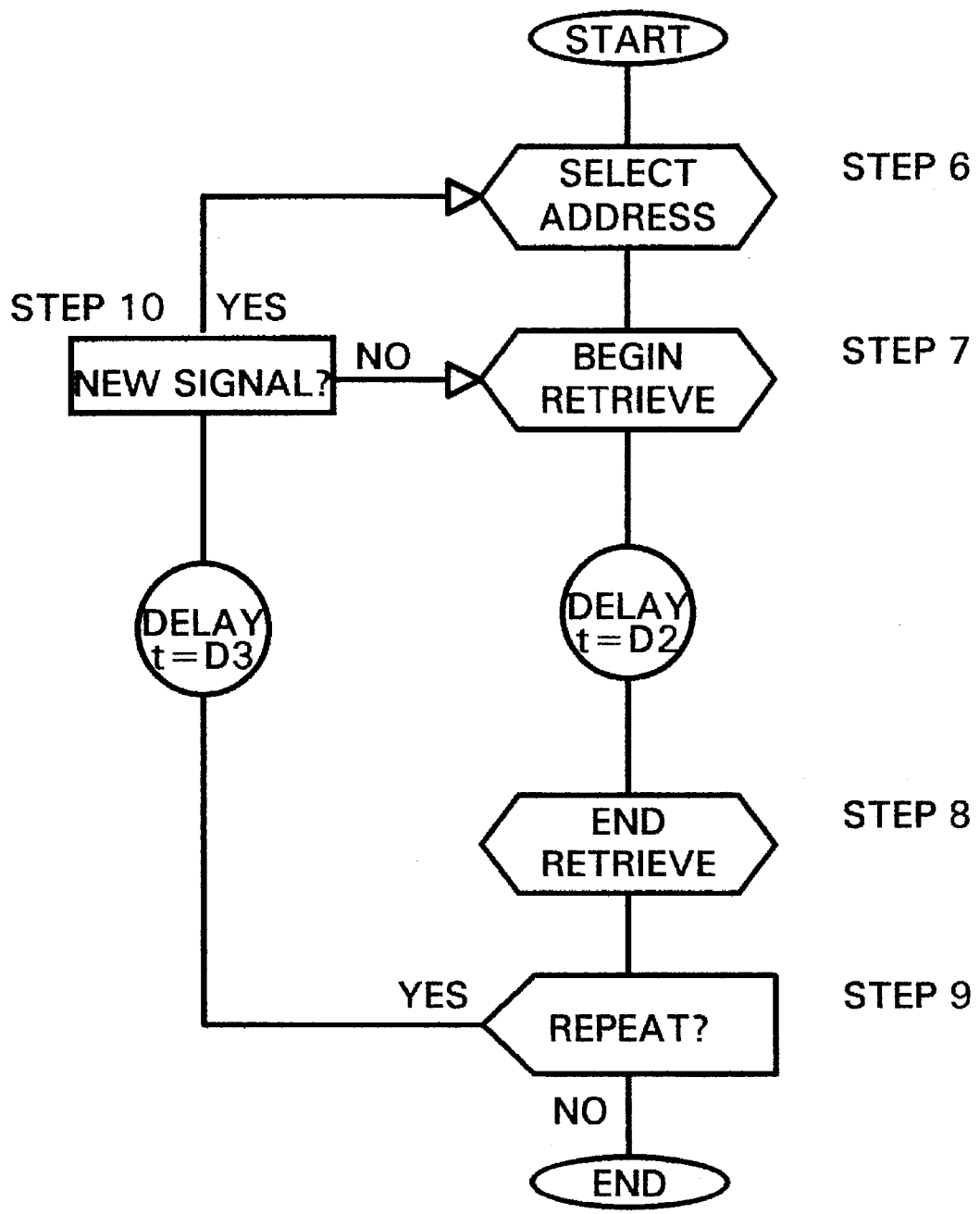
FIG. 1B—Event Block Diagram Flow Chart—Retrieval Sequence

FIGS. 1A and 1B are event block diagram flow charts depicting the sequence of steps in the method of producing analog telephone signals. For purposes of simplifying the discussion, the production of only two analog telephone signal types, A1 and A2, from a plurality of types, will be illustrated. Furthermore, it will be assumed that there exists an analog signal storage means by which the method of signal production can be realized, and that that means has a total storage capacity of duration tt, and an addressable storage capability in which time allocated for the storage beginning at an address location is tm (a message space). The beginning of that message space is referred to as t=0. It is further assumed that within that means is a minimum capability of responding appropriately to a Store command, a Retrieve command and a Stop command. It is further assumed for simplicity of the initial discussion that only one signal type is being stored and produced at any one time.

FIG. 1A is a flow chart illustrating the event sequence in the storage process for storing samples of a plurality of different types of Analog Telephone Signals, hereinafter referred to as ATS. A particular type of ATS from source examples as illustrated in FIG. 1D is caused to be selected for storage, Step 1. An address at which to begin storage of the signal is caused to be selected, Step 2. Thereafter, Store, Step 3 is caused to be selected beginning storage. Storage continues until a) the end of the message space, or b) End Store, Step 4 is caused to be selected (using a stop instruction) a time delay, D1, following Begin Store, Step 3 causing to be stored a sample of the signal of duration D1. This ATS sample will be hereinafter referred to as A1, or signal A1. This storage process is repeated, Step 5, for a second ATS type by causing to be selected a second ATS source, Step 1, and causing to be repeated Steps 2 through 4 in the sequence described above resulting in the storage of a sample of a second ATS type of duration D1', herein referred to as A2.

FIG. 1B is a flow chart illustrating the event sequence in the retrieval process of producing a plurality of different ATS types. The retrieval process is initiated by causing to be selected an address, Step 6, corresponding to the message space of a previously stored ATS sample. For purposes of discussion, this ATS sample will be signal A1 referred to above. Next retrieve is caused to be selected, Step 7, beginning the retrieval of signal A1. Without further action, this retrieval continues for a time duration equivalent to the duration of the message space. Alternately, a shorter version of signal sample A1 is produced by causing to be selected End Retrieve, Step 8 (using a stop instruction), a time delay, D2, following Begin Retrieve, Step 7, resulting in a produced version of A1, D2 in duration.

The retrieval process can be repeated, Step 9, a time delay, D3, following End Retrieve, Step 8 by causing to be selected Repeat?, Step 9, "YES" for another signal by electing New Signal?, Step 10, "yes" or "no". A "no" election causes Begin Retrieve, Step 7, to be selected without a change of address causing to be produced signal sample A1 of duration D2'. A "yes" election causes to be selected a new address, Step 6, causing to be retrieved, Step 7 a new signal sample, for example A2, until retrieve is ended, Step 8, a new time delay D2" following Begin Retrieve, Step 7 causing to be produced a version of A2, D2" in duration, a time delay interval, D3, following the end of the produced version of A1.

Figure 1C:
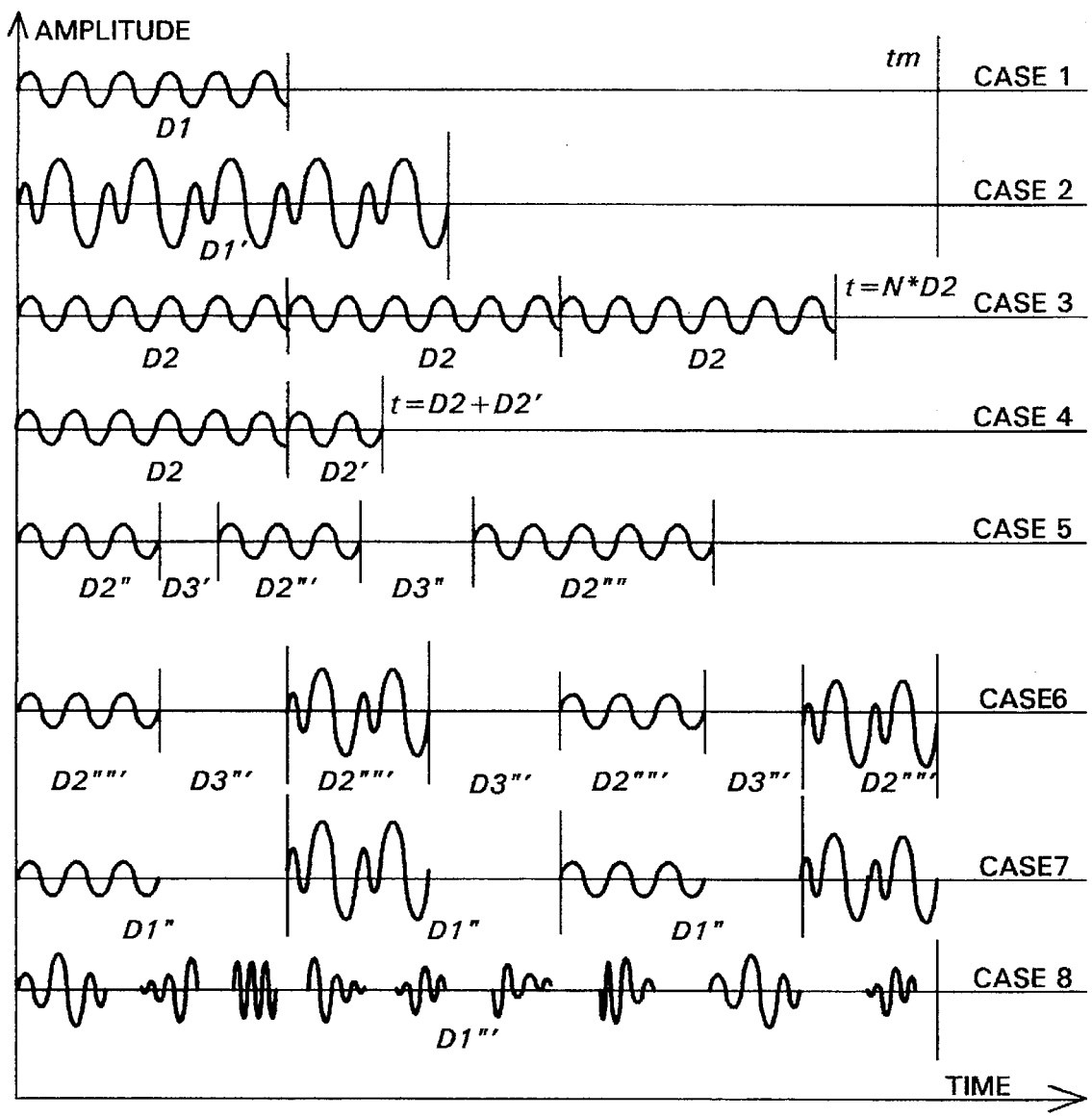
FIG. 1C—Amplitude vs Time Plot of Signals
Figure 1D:
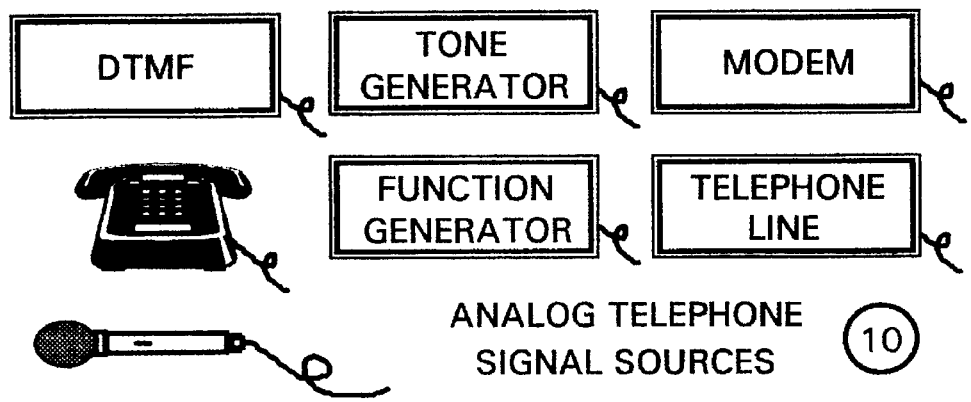
FIG. 1D—Illustration of a Plurality of Analog Telephone Signal Sources
Figure 1E:
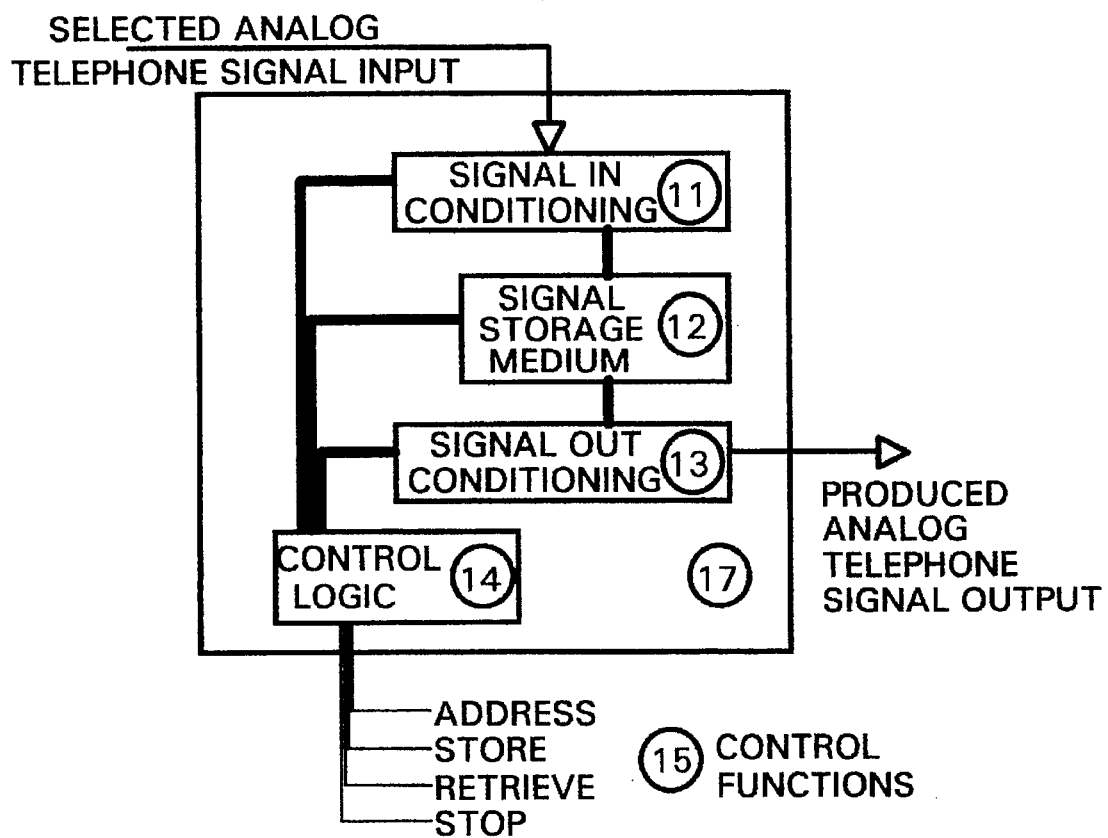
FIG. 1E—Schematic Block Diagram—Embodiment of a Universal Means for Producing a Plurality of Analog Telephone Signal Types FIG. 2—Electronic Schematic Diagram of One Preferred Embodiment FIG. 3—Isometric Exploded View of One Preferred Embodiment FIG. 4—Schematic Block Diagram of One Preferred Embodiment—Enhanced Capability "Smart Phone"
Figure 2:
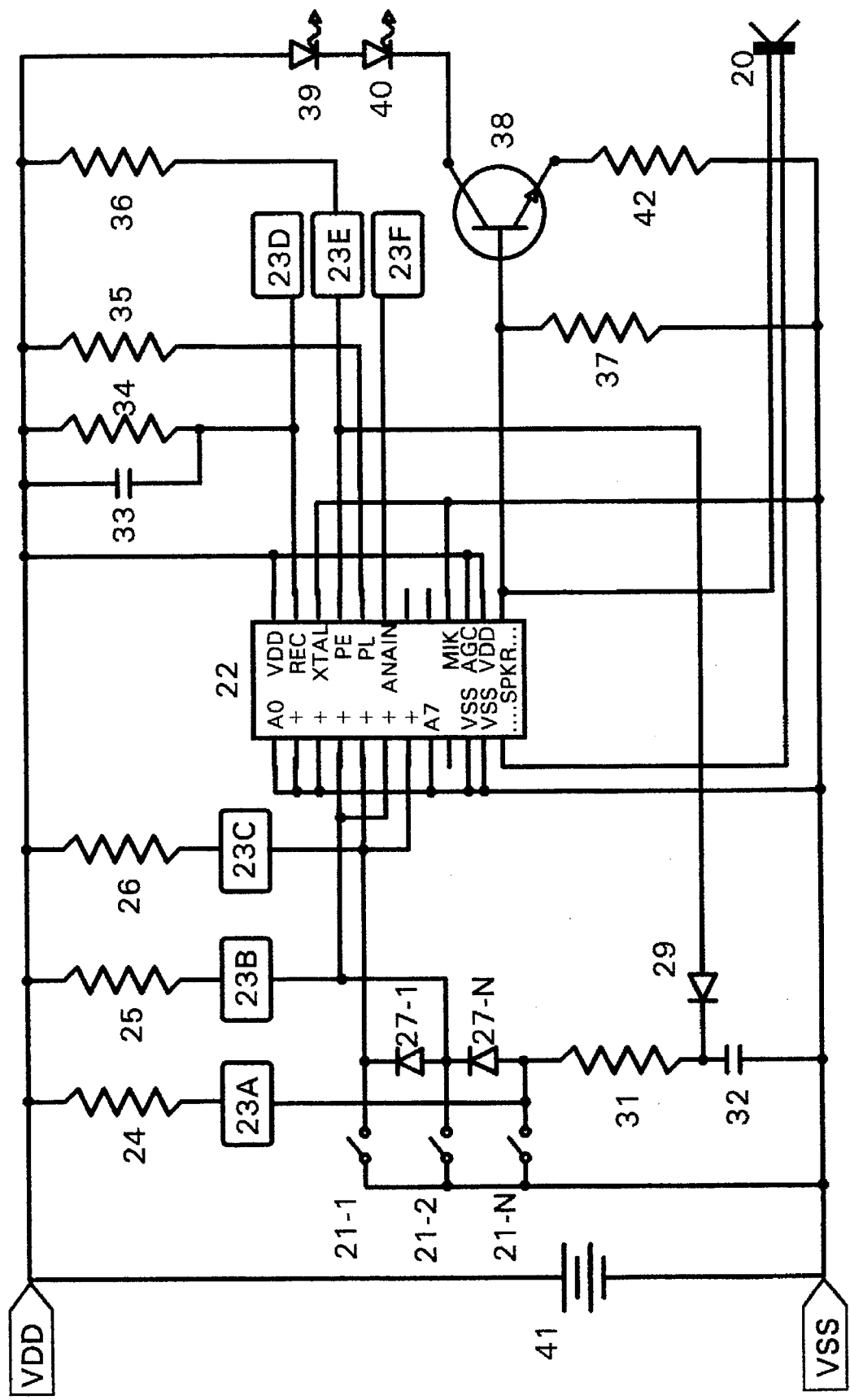

FIG. 1C is an amplitude vs. time plot of signal types At and A2 as stored and A1 and A2 as retrieved in accordance with the method of signal production as described for FIGS. 1 and 2 and an amplitude vs. time plot of a third signal type, Case 8.

Cases 1 and 2 illustrate the stored sample versions, A1 and A2, of two different types of analog telephone signals selected from source examples illustrated in FIG. 1D. These samples have been stored at two different addresses for durations D1 and D1' respectively in memory spaces of tm in duration and singularly and adressably retrieved.

Case 3 is an example of signal sample A1 as iteratively retrieved N times for durations D2 equal to the stored duration, D1, without delay, D3 between retrievals. That is, referring to the flow chart, FIG. 2, Step 6, Address, is caused to be selected for stored signal sample A1 followed by Begin Retrieve, Step 7, with a delay, D2, before causing to be selected End Retrieve, Step 8, followed by Repeat?, Step 9, "YES". No delay D3 is instituted prior to electing New Signal?, Step 10, "NO" causing Begin Retrieve again. The result is the production of an analog telephone signal of duration N * D2 from signal sample A1.

Case 4 is an example of signal sample A1 retrieved for a duration, D2=D1 on the first retrieval and a duration, D2'<D1, on the second retrieval with Delay D3=0 between retrievals. That is, referring again to the flow chart, FIG. 2, Step 6, Address, is caused to be selected for stored signal sample A I followed by Begin Retrieve, Step 7, with a delay, D2, before causing to be selected End Retrieve, Step 8, followed by Repeat?, Step 9, "YES". No delay D3 is instituted prior to electing New Signal?, Step 10, "NO" causing Begin Retrieve again, this time with a delay, D2'. The result is the production of an analog telephone signal of duration D2+D2' from signal sample A1.

Case 5 is an example of signal sample A1 as interuptedly retrieved for various durations, D2", D2''', D2"'', at various intervals, D3',D3". That is, referring to flow chart, FIG. 2, Step 6, Address is caused to be selected for stored signal sample A1 followed by Begin Retrieve, Step 7 with a delay, D2" before causing to be selected End Retrieve, Step 8, followed by Repeat?, Step 9, "YES". A delay D3' is instituted creating a time interval prior to electing New Signal?, Step 10, "NO" causing Begin Retrieve again, this time with a delay, D2''', before causing to be selected End Retrieve. The process is continued for additional D3 delays and D2 delays, causing to be produced a signal of tone bursts of selectable durations and intervals.

Case 6 is an example of signal samples, A1 and A2, as alternately and interuptedly retrieved for fixed duration, D2"''', at a fixed interval D3"". That is, referring to flow chart, FIG. 2, Step 6, Address is caused to be selected for stored signal sample A1 followed by Begin Retrieve, Step 7 with a delay,D2""before causing to be selected End Retrieve, Step 8, followed by Repeat?, Step 9, "YES". A delay D3"" is instituted creating a time interval prior to electing New Signal?, Step 10, "YES" causing the to be selected a new address, Step 6, corresponding to the storage location of signal sample A2, followed by Begin Retrieve again, with a delay, D2"", before causing to be selected End Retrieve. And the process is continued for additional D3 delays and D2 delays causing to be produced a signal of alternating tone burst types corresponding to stored sample types A1 and A2 and of determined duration and determined interval.

Case 7 represents a signal identical to the signal of Case 6 but produced by a variation in the use of storage and retrieval processes of FIGS. 1 and 2. In this instance each selected signal is stored at separately selected memory spaces of duration tm for a duration of D1"=D2"" creating signal samples A1 and A2 each having a duration D2"". The retrieval process begins as in Case 6 by selecting the address for signal sample A1; however in this case the delay, D2, prior to ending the retrieval, exceeds the duration of the sample in storage and is equal to a total delay of D2""+D3''". The retrieval is then repeated for signal sample A2 with no delay D3 causing to be produced a signal identical to that of Case 6.

Case 8 is a special example of the signal type produced in Case 7, wherein the signal selected from Analog Telephone Signal Sources 10, FIG. 1D, is a stream of changing and interrupted dual tones as might be produced from a telephone unit upon activation of the auto dial function. This entire stream of tone bursts is stored in one memory location and may represent, for example, a complete telephone number or a sampled portion of the number, for instance, the area code. Retrieval of this sample is accomplished with the same variations as described above in accordance with the retrieval process of FIG. 2.

It is evident from the discussion above that an infinite variety of analog telephone signals, having unlimited variations in duration and cadence, can be produced using the herein described method. In practice, the signal of Case 3 could represent a continuous dial tone, the signal of Case 4 could represent an interrupted busy signal, the signal of Case 5 could represent an annunciator signal and the signal of Case 6 could represent a DTMF dialing sequence.

It is noted that in Cases 3 and 4, FIG. 1C, the signals are not seamless; that is, each time a signal is retrieved, it begins in a phase which differs from the phase in which it ends. This condition is a near-seamless iteration of the signal, not objectionable to or not detectable by the auditory senses. A seamless retrieval can be realized by causing to be stored a signal having a duration, tm, equal to an integral number of periods of that signal. In the iterative retrieval process of that signal, the beginning phase will then exactly match the ending phase.

It is further noted that in the preceding discussion, for the purposes of generalizing, it was assumed a means having more than one addressable message space and therefore requiring an addressing capability. The method applies similarly where there exists only one message space, in which case the Select Address, Step 2, FIG. 1A, and the Select Address, Step 6, FIG. 1B, are eliminated from the process. The result is still practical in that a single message may constitute a series of DTMF signals interspersed with pauses representing one or more telephone numbers, or a FSK signal representing an ASCI coded bit stream of alphanumeric information.

It is yet further noted that to simplify the foregoing discussion of the method, it was assumed that only one signal at a time was caused to be selected for storage in a given message space of duration tm. In practice, the storage process can be applied to more than one signal type being selected, Step 1, simultaneously. For instance, a DTMF Signal Source 10, FIG. 1D, could be selected with a signal amplitude of −9 db, while at the same time, a Voice Signal Source 10 could be selected with a signal amplitude of zero db. The stored and subsequently retrieved signal would be a simultaneous voice over a DTMF signal. This simultaneous mix of signal types could have a practical use for aurally annotating the identity or in this case the telephone number of the retrieved signal without affecting the intelligibility of either signal type as detected upon retrieval, by appropriate receptors, i.e.: a person and a DTMF receiver.

FIG. 1D is an illustration of a plurality of Analog Telephone Signal Sources 10. They include a telephone, a microphone, a dual tone multi frequency production device, a modem signal production device, a tone generator, an analog signal function generator, and an analog telephone line.

FIG. 1E is a schematic block diagram showing a universal means, PATS Means 17, for producing a broad range of analog telephone signal types by storing samples of signals selectively from Analog Telephone Signal Sources 10, FIG. 1D. A signal type from Source 10 is selected and operationally coupled to Signal In Conditioning Circuit 11, where said signal is conditioned prior to storing into Signal Storage Medium 12, and again conditioned prior to output, via Signal Out Conditioning Circuit 13, all under the control of Control Logic Circuit 14. Control Logic Circuit 14 is activated according to selected external Control Functions 15. Control Logic Circuit 14 is in operational relation to Signal In Conditioning Circuit 11, Signal Storage Medium 12 and Signal Out Conditioning Circuit 13 and serves to implement external Control Functions 15 inputs, and provide the logic sequences for writing signals into or reading signals out of the Signal Storage Medium 12. External Control Functions 15 comprises address, store, retrieve and stop commands. Signal In Conditioning Circuit 11 may comprise signal level setting circuitry, operational amplifiers and anti-aliasing filters. The Signal Out Conditioning Circuit 13 may comprise smoothing filters and operational amplifiers.

In the first instance, a signal type from external Analog Telephone Signal Sources 10 is selected for storing in Signal Storage Medium 12. The address location for storing said signal is designated through Control Logic Circuit 14 from "Address" of Control Function 15 inputs. The Control Function 15 input, "store", is then activated causing Signal Storage Medium 12, by the action of Control Logic Circuit 14, to begin storing the signal starting at the specified storage address. The Control Functions 15 input "Stop" is activated a time tm (t=D1 of FIG. 1A) following the "Store" function, causing storage to cease and to be stored a sample of the signal type. This process of storing may be repeated for any analog telephone signal, any number of times, for any duration and at any address location, up to the time duration allotted between address locations or up to the total storage time available in Signal Storage Medium 12.

In the second instance, to produce a signal, the address corresponding to the start of that signal (that is, the same address at which that signal was stored in the first instance) is designated through Control Function 15, "Address", followed by the activation of the "Retrieve" function from Control Function 15 through Control Logic Circuit 14. This process of retrieval may be repeated at any address location, any number of times, to produce any analog telephone signal type or any combination of analog telephone signal types that have been previously stored.

In certain telephone signal applications it is necessary to produce an uninterrupted signal, usually a continuous tone signal of long duration, such as a dial tone. While it is possible to store said signal in a PATS Means for the expected duration of the signal, a preferable method is to seamlessly or near seamlessly iterate (loop) the retrieval process. Near seamlessly means: not detectable by or objectionable to the auditory senses. Only a sampling of said telephone signal would then need to be stored in a PATS Means, thereby using the storage medium more efficiently. The sampled signal is then seamlessly or near seamlessly produced by continuously re-retrieving it from the storage medium, for the duration of signal required, as described in accordance with the method and illustrated in FIG. 1C, Case 3, i.e.: the retrieve function is activated without an address change each time the sampled signal ceases at t=D1.

Non-seamless iteration of a stored analog telephone signal naturally follows. For instance, a busy tone need be stored for only one tone burst, and then retrieved repeatedly, with a pause between each retrieval. This retrieval process can be repeated indefinitely, as described in accordance with the method and illustrated in FIG. 1C, Case 4.

The requirement for frequency accuracy is satisfied using the PATS Means, by selecting a source signal (FIG. 1D) of a determined frequency precision for storage. The signal retrieved from the storage means will emulate the frequency of the stored signal precisely.

Another requirement for certain analog telephone signals is that these signals have various amplitudes. For instance, an annunciator signal will need to be much louder than a dial tone. This requirement is accomplished by using the PATS Means of producing these two different types of signals by adjusting the amplitude of the signal selected for storage. The retrieved signals will then emulate the amplitude of the stored signals, eliminating any external signal amplification or attenuation means.

FIG. 2 is an electronic schematic diagram demonstrating one embodiment of a practical electronic circuit for storing and retrieving analog telephone signals. PATS Means 22 is a large scale integrated (LSI) circuit device. A single chip device from Information Storage Devices Inc., no. 1416, was selected to illustrate the practicality of said signal production method and for its simplicity of use. Symbols A–F represent Programming Pads 23 and correspond to the input line and Control Functions 15 of FIG. 1E. Programming Pads 23A–F perform the functions:

Pad 23A Address 3

| Pad 23B | Address 2 |
| Pad 23C | Address 1 |
| Pad 23D | Record |
| Pad 23E | Play - edge triggered |
| Pad 23F | Analog Signal In |

There are enlarged circular conducting places on a printed circuit board for metallic contact by external pins of a programming device not shown. Functions represented by Pads 23 A–E are activated by bringing the appropriate pad to a logic low level. Other components illustrated here are common in the art. Push button switches 21, 1–n, set up an address in LSI PATS Means 22 through address connections A0–A7 and activate LSI PATS Means 22 through Diodes 27 1-N, and Diode 29, and Resistor 31, by bringing the appropriate address lines and the PE line low (down to Vss). Resistors 25 and 26 pull up the appropriate address lines to Vdd. Resistor 31 in series with Resistor 24 charges Storage Capacitor 32 to the high level (Vdd), and Resistor 36 keeps the PE (Play Enable/edge triggered) line at Vdd until activated. When one of the push button switches, for instance Switch 21-2, is pressed, Address Lines A3 and A5 go low to Vss almost immediately. At the same time Capacitor 32 begins discharging through Resistor 31 and Diode 27-N until the forward voltage across Diode 29 is approximately 0.6, volts at which time the PE line is also pulled low. This going low of PE occurs approximately 2 micro seconds after the address lines go low, allowing LSI PATS Means 22 time to read the address before activating playback. Diodes 27 1-N isolate Switches 21 (1–n) from activating any but their designated address lines while allowing PE activation from each Switch 21 (1–n). Resistor 35 keeps the PL line (Play Enable/level activated) high so a very low current "sleep" mode is maintained in LSI PATS Means 22. Resistor 34 keeps the Rec line (Record) high until brought low at Programming Pad 23D, "Record", and Capacitor 33 insures that this Rec line stays at Vcc even when changing Battery 41.

To store an analog telephone signal at an address, the appropriate address is first selected by closing the corresponding Switch 21 (1–n), or alternately, by bringing the corresponding programming pad low to Vss, then bringing the Rec line low and then inputting a telephone signal through Programming Pad 23F to ANAin (Analog Signal In). Note that even though play is initiated when Switch 21 (1–n) is closed or its corresponding pad is brought low prior to Rec being brought low, the LSI PATS Means 22 is structured such that Rec takes precedence over PE and will reread the address lines and begin recording at exactly the address designated.

Speaker outputs are connected directly to an Acoustic Transducer 20. Upon playback, these Speaker outputs are biased high to about 1.5 volts. This voltage is used to turn on Transistor 38 through Feedback and Current Limit Resistor 42, bringing the collector of Transistor 38 to about 1.0 volt. Light Emitting Diodes 39 and 40 are coupled in series between Vdd and the Transistor 38 collector. These LED's 39 and 40 will activate when LSI PATS Means 22 activates, but fail to activate when Vdd falls below approximately 4.0 volts resulting in a visual low battery indication. Resistor 37 is a pull down resistor, insuring that Transistor 38 turns completely off during the "sleep" mode of LSI PATS Means 22. Most components are not critical as to value. The following list suggests possible values or types:

| | |
|---|---|
| Resistors 25, 26, 34, 35, 36, 37 | 100K |
| Resistors 24, 31 | 10K |
| Resistor 42 | 1K |
| Diodes 27-1, 27-N, 29 | low power switching type 1N914 |
| Capacitors 32, 33 | .001 micro farad |
| Transistor 38 | low power switching type 2N3904 |
| LED's 39, 40 | low current, approximately 1.5 v forward bias |
| Battery 41 | 6 volt |

Figure 3:
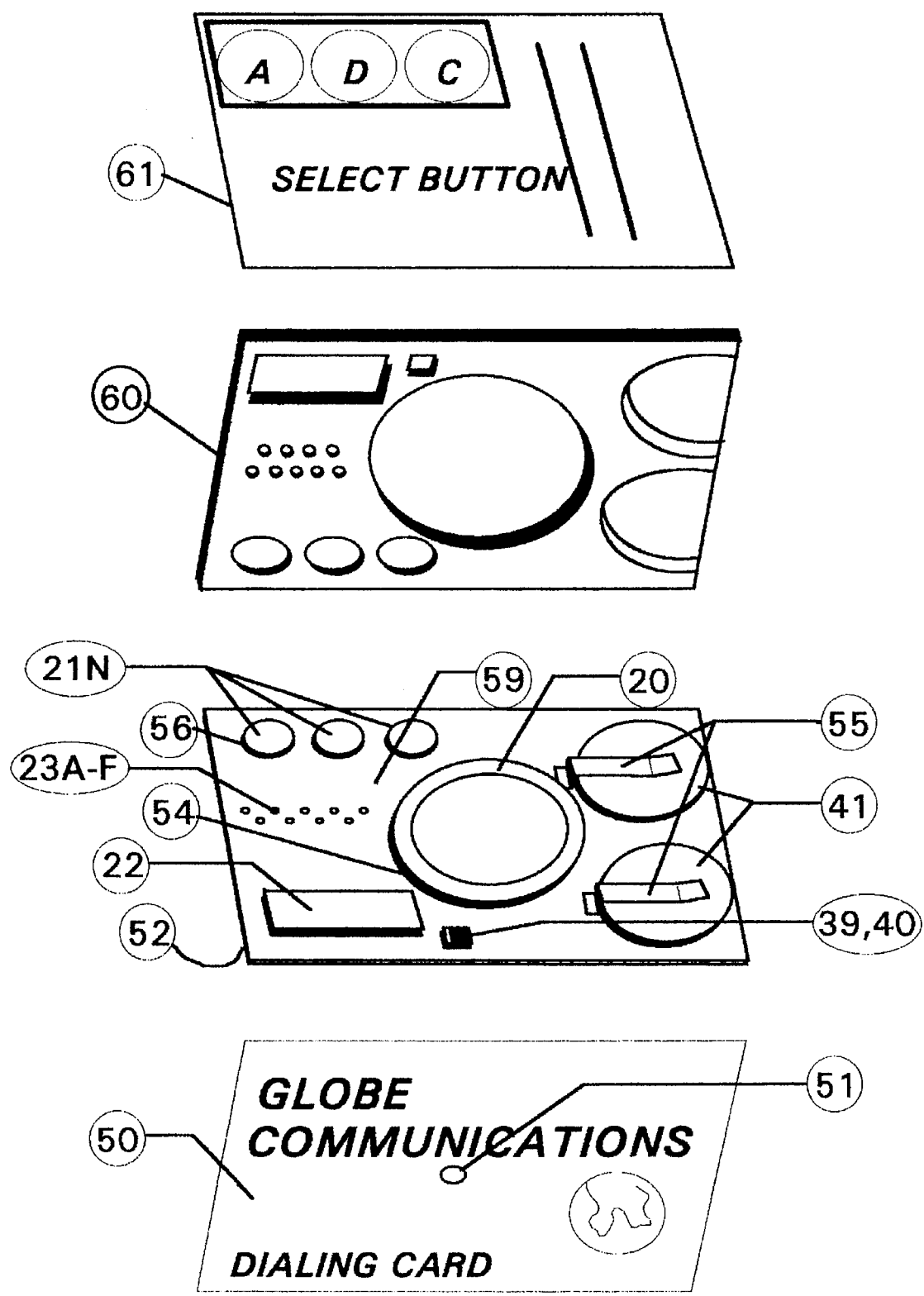

FIG. 3 is an isometric exploded view of one preferred embodiment of a thin card-like module, having the electronic configuration shown in FIG. 2, using the method illustrated in FIGS. 1A–B and described in the accompanying text. The module is designed for acoustically coupling telephone signals into a telephone mouthpiece and is referred to as an ACTADD (Acoustically Coupled Telephone Auto Dialer Device). It is a laminated assembly consisting of a Bottom Adhesive Label 50 having identification or decorative copy and a small Through Hole 51 positioned to align with a second small Hole (not shown) in Printed Circuit Board 52. Circuit Board 52 consists of a layer of insulating material having a conductive copper pattern on Top Surface 59 etched to functionally replicate the electronic circuit of FIG. 2. Principle components are shown in a possible layout on Circuit Board 52 and include LSI PATS Means 22, Acoustic Transducer 20, Spacer Ring 54, Batteries 41, Programming Pads 23(A–F), LED's 39 and 40 and Pushbutton Switches 21 (1–n). The conductive poles of Switches 21 (1–n) are an integral etched part of Circuit Board Etched Surface 59 of Circuit Board 52, and have an overlaying, flexible, conductively coated inner surface, disc, of Mylar-like Material 56, fixedly positioned slightly above and concentric with the etched poles, such that a slight force vector, having a component perpendicular to the plane of the Mylar-like Material 56, causes a concave deflection of the Mylar-like Material 56, causing the conductive coating to contact both of the etched poles of a Switch 21 (1–n) simultaneously, resulting in a low resistance conductive state between the two poles known generally as the condition "on". These switch types are known in the art as membrane switches. The Acoustic Transducer 20, in this preferred embodiment is a piezoelectric disk mounted parallel to but separated from the Circuit Board 52 by a narrow Spacer Ring 54 of adhesive coated compliant material. This mounting means creates a cylindrical cavity between the Acoustic Transducer 20 and Circuit Board 52. By selectively controlling the thickness, width and density of Spacer Ring 54, a resonant cavity is created, which is acoustically larger than the cavity that would be created by using a solid spacer ring of the same dimension. This mounting method allows the selection of a thin piezoelectric disk to serve as the Acoustic Transducer 20, since the resonant cavity will cancel much of the harmonic output endemic to this type of transducer, resulting in good wave form reproduction. Not shown, and concentric with the Acoustic Transducer 20, is a small through hole in Circuit Board 52, allowing the acoustic pressure waves generated to partially escape and cause any adjacent telephone microphone to respond vigorously. In addition, resiliently mounting the Acoustic Transducer 20 creates a high impedance mechanical acoustic path between the Transducer 20 and any external contacting surface like a telephone mouthpiece. This resilient mounting results in an undistorted telephone signal being acoustically coupled, via air pressure waves only, to a telephone microphone without regard to critical positioning or contact between the card-like module and the telephone mouthpiece.

Batteries 41 are coin type lithium nominal 3.0 volt cells, connected in series via the Circuit Board 52 conductor elements and Contact Elements 55 which allow said Batteries 41 to be replaced by sliding the Batteries 41 out of the end of the card-like module. LED's 39 and 40 are solder mounted to the Circuit Board 52 Etched Surface 59 in a position such that they align with a hole in Plastic Spacer 60 allowing light to pass through to Top Surface 61. Programming Pads 23(A–F) are positioned so as to align with a series of holes in Spacer 60, allowing needle-like contacts to be inserted through Top Surface Label 61 to contact Pads 23(A–F), for recording into said card-like module. Spacer 60 is a plastic injection molded or punched piece, having numerous other holes or clearance cavities to accommodate the various components mounted on Circuit Board 52. Of particular importance is the hole in Spacer 60 which surrounds the Acoustic Transducer 20. This hole must be adequate in size, such that Acoustic Transducer 20 does not contact the edges of said hole on final assembly. Both faces of Spacer 60 are adhesive coated to allow final assembly of Circuit Board 52 with Spacer 60 and Top Surface Label 61 by adhesive bonding. Top Surface Label 61 is a thin plastic label that can be printed with operating instructions, logos and other pertinent data. Top Surface Label 61 may be a vinyl or other soft clear plastic material, so that programming pins (not shown) can be inserted through Top Surface Label 61 to contact Programming Pads 23(A–F). Top Surface Label 61 is optically clear in the area just over LED's 39 and 40, to allow light from said LED's 39 and 40 to be visible to a user of the card-like module. Printing on Top Surface Label 61 will vary according to the anticipated use of said card, as will become clear in the following discussion of recording into said card.

Recording into said card is accomplished after the entire assembly of FIG. 3 is completed and the appropriate Top Surface 61 copy and graphics have been established. This allows completed blank (non-recorded) cards to be inventoried. To store analog telephone signals, the card is inserted into an alignment fixture (not shown) and operationally connected to a programming device (not shown) through metallic contact pins (not shown) inserted through Top Surface Label 61. The programming device would comprise a means for selecting the analog telephone signal type and a means for bringing an address (button) or corresponding address Programming Pad 23A–C and Rec Pad 23D to the electronically low level (Vss). Once the address is established low, Record function is brought low and the selected signal is activated and input through Pad 23F for the duration of signal needed. This process is repeated for each button (address) available, as per the Top Surface Label 61 graphics, designating a particular use of the module. For example, insert card in fixture, take address low, take record low and activate the preprogrammed speed dial function of a telephone signal source and then add a voice message using the telephone handset through analog input Pad 23F. Release Rec to Vdd, release address to Vdd. Check recording by bringing address low again and listening to card. Rerecord if necessary. Repeat process for other addresses as needed. Remove card from fixture and use.

It may be desirable for long distance subscriber to use said card when away from the base station telephone to place calls using his or her long distance carrier. Normally, these calls are made by dialing an access number; access to AT&T, for instance, requires the caller to dial 102880. Once the access number is dialed, a voice or a tone signal from the carrier, prompts the caller to a enter the number being called. After this, a voice or tone signal from the carrier prompts the caller to enter his or her own phone number and a four digit personal identification number (PIN). This process requires the dialing of 20 digits plus the number being called. With this card dialer module, the access code is recorded into the card at the push- button I (PB1) address, using the speed dial signal of an ordinary telephone. The accounting code (the subscriber telephone number) and PIN are recorded into the card at the pushbutton 2 (PB2) address, from the same speed dialer source. A user simply places the card to the mouthpiece of the telephone and presses PB1 for long distance access; after prompting and then dialing the number being called, the user again places card to telephone and presses PB2 effecting a user selectable delay between dialing and sending account data to enter accounting data and PIN. The card use has reduced the dialing of 20 digits down to a two touch process. Additionally, a long distance carrier supplying subscribers with said cards would probably want to include a voice message with PB1 such as "Thank you for using American Call Carrier". This can be accomplished by talking into the same ordinary telephone used to produce the speed dial signals. A third pushbutton (PB3) on the card could be recorded with a frequently dialed number. A user presses this button when prompted to enter the number being called. This further reduces dialing requirements.

Another practical application of said card would be its distribution by a mail order company for use by a consumer. The card would be recorded into at PB1 with a speed dialed number of the mail order company and a voice thank you message; recorded into at PB2 with a modem signal (FSK) of the caller's name, address and account number; and recorded into at PB3 with a modem or DTMF signal of caller's credit card number, bank and expiration date. The user calls the company by placing the card against the telephone mouthpiece and pressing PB1. An automatic prompt from the company would request customer ID, delivered by pressing PB2. A salesperson could then come on the line and be able to address the customer by name. Upon completion of the order, the customer would again place the card to the phone, and press PB3 to deliver credit card information. Yet another practical use of the card would be for getting a lost child to call home. PB1 might include a message from More and the family dog like "Hi, honey. Mommy misses you; so does Rover (Woof, woof); put your card against the phone mouthpiece and press the red button to call me."

Figure 4:
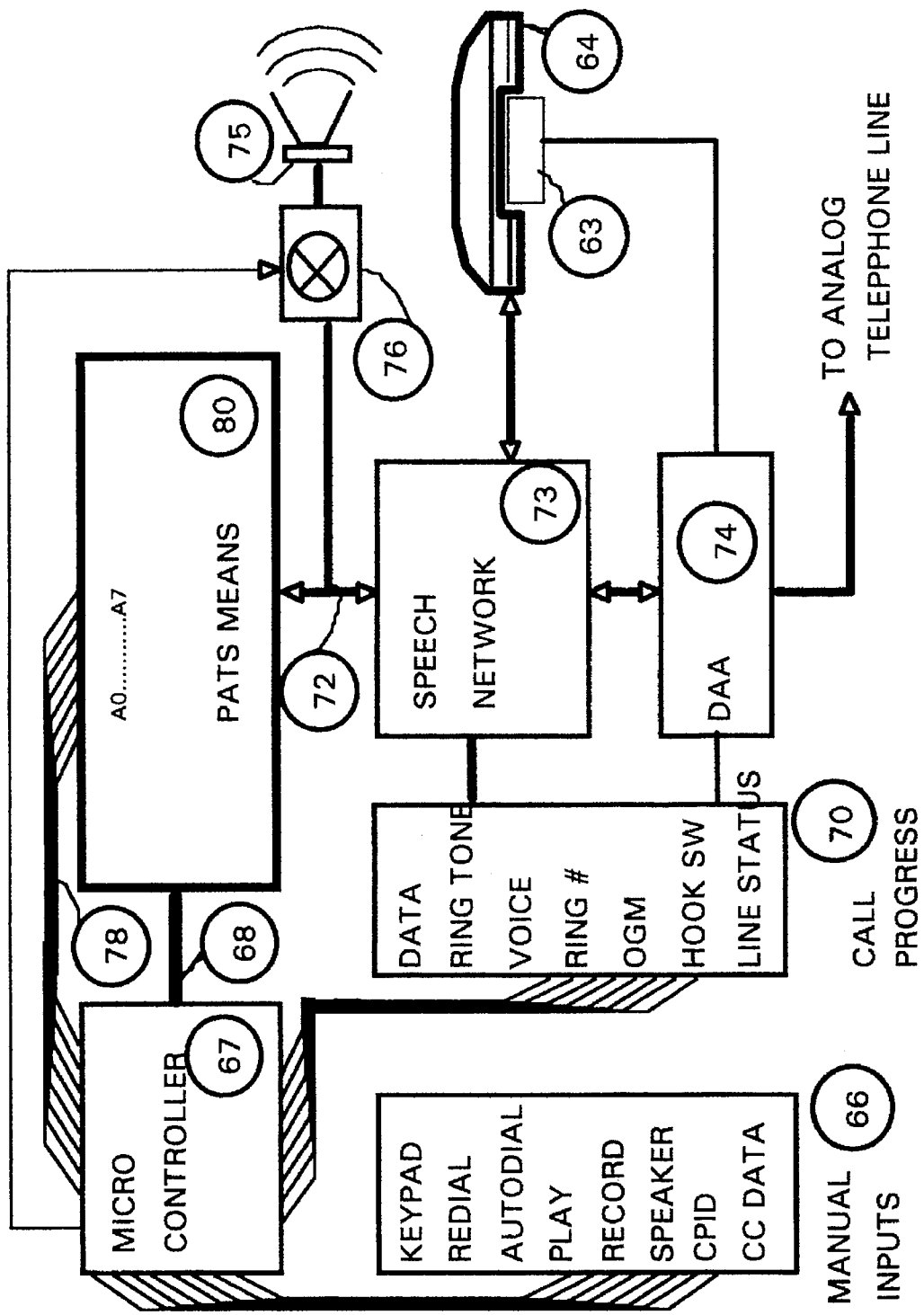

FIG. 4 is a schematic block diagram of one preferred embodiment of a Smart Phone using the analog telephone signal production method and means described herein to provide all required signals as well serve as the recording medium for the included answering machine function.

The Smart Phone comprises Microcontroller 67 in operative relation with PATS Means 80 via Control Buss 68 and Address Buss 78. Manual Inputs 66 are in operative relation with Microcontroller 67 to provide a user interface usually in the form of switch depressions. Call Progress Detection 70 is in operative relation with Microcontroller 67 to signal line status and a variety of other operations depending on the type of audio on the line. Microcontroller 67 controls Analog Switch 76 which in turn controls the flow of analog signals from Analog Buss 72 to Speaker 75 which serves as the annunciator transducer. Analog Buss 72 serves as the audio connection between PATS Means 80 and Speech Network 73 circuitry which is also operationally connected to Call Progress Detection 70, Hand Set 64, and Data Access Arrangement 74. DAA 74 is operationally connected to Hook Switch 63 and provides audio duplex interface to the Analog Telephone Line and serves the ring detect and auto off hook functions.

The Smart Phone operates transparently to a user like any other enhanced capability telephone/answering machine. In particular, however, PATS Means 80 serves to produce all analog signals transmitted ( other than real time voice) by the Smart Phone and record all incoming messages.

For instance to place a call, a user lifts Hand Set 64 closing Hook Switch 63 and activating DAA 74, creating an audio link to the analog telephone line. The user dials a number by pressing the appropriate keys of the keypad of Manual Inputs 66. Each key pressed is sensed by Microcontroller 67, which generates a corresponding address via Buss 78 and retrieve and stop commands via Buss 68 to PATS Means 80, causing PATS Means 80 to produce the signal type corresponding to the key pressed. In this case the signal is a particular dual tone produced from a sample of that particular dual tone that was previously stored at the selected address.

Other Manual Input 66 functions operate similarly. For instance, the user may elect to send a CPID ( Caller Initiated ID ) message or CC Data (Credit Card Data) by pressing the corresponding button. This action in turn causes Microcontroller 67 to generate a corresponding address and activate PATS Means 80 to produce the analog signal stored at that address. In these cases, that analog signal may be some type of FSK data stream or a voice message.

Alternately PATS Means 80 can be used as an FSK engine by storing samples of the appropriate two tones at separate address locations and having these two tones selectively retrieved, under the control of Microcontroller 67 acting as the bit stream generator in response, for instance, to alpha/ numeric inputs of KEYPAD of Manual Inputs 66.

In general, PATS Means 80 stores and produces various analog signal types under the command of Microcontroller 67 which controls the selection and duration of the signal type produced by selecting the address for that signal type and controlling the retrieve and stop functions either in accord with a Manual Input 66 or in accord with a Call Progress 70 input. For instance, Call Progress 70 may detect an incoming FSK DATA signal via Speech Network 73 requesting CPID data. Call Progress 70 signals Microcontroller 67 which in turn commands PATS Means 80, via Address Buss 78 and Control Buss 68, to send CPID data via Audio Buss 72, Speech Network 73 and DAA 74, onto the telephone line.

Microcontroller 67 also controls the storage of analog signals in PATS Means 80 by selecting an address for storage via Buss 78 and the store command via Control Buss 68. For instance, Call Progress 70 may detect an incoming voice message which in turn signals Microcontroller 67 which selects an unused segment of storage space in PATS Means 80 via Address Buss 78 and activates the store command of Control Buss 68 causing PATS MEANS to store the incoming message until signaled to stop via Control Buss 68 from Microcontroller 80. The audio signal for storage arrives at PATS Means 80 via Audio Buss 72 from Speech Network 73. Similarly an outgoing message (OGM) can be stored in PATS Means 80 from the telephone line as above or from Hand Set 64 via Speech Network 73 and Audio Buss 72 and sent upon command of Microcontroller 67 upon detecting a signal from Call ProHess 70 in response to a preselected number of rings or in response to a data signal requesting a particular voice mail box.

A customized annunciator signal can be produced by the Smart Phone, by storing, under the control of Microcontroller 67 at a selected address in PATS Means 80, a sample of that signal. Upon detecting a ring signal, DAA 74 signals Call Progress 70 which in turn signals Microcontroller 67 to retrieve the annunciator signal from PATS Means 80 and to turn on Analog Switch 76 causing Speaker 75 to respond vigorously to the annunciator signal. The annunciator signal sample can be repeatedly retrieved by Microcontroller 67, with pauses between retrievals simulating, for instance, a normal ring sound where the stored signal sample was that of a normal ring. Under Microcontroller 67 command that ring sound can be increased in duration each time it's repeated by seamlessly and iteratively retrieving the stored sample.

The reader will see that significant function, performance, economy and simplicity advantages ensue from this universal method of analog telephone signal production, and that the method has been made real through the examples of actual apparatus resulting.

The ACTADD module, for example is a practical example of using the Produced Analog Telephone Signal (PATS) method. While quite simple and inexpensive in its construction, this ACTADD provides functions not heretofore deemed possible from a single thin compact apparatus. The PATS method transforms this apparatus from a simple, one number dialer, to a long distance carrier, automatic dialing and accounting card, a call home card, a data card, a telephone credit card, a dating card and any number of other practical applications, limited only by the imagination.

While the ACTADD module was described as a convenient method of dialing a telephone using acoustic coupling in combination with a PATS Means, a similar module could be equipped to use optical or inductive coupling. This could result in even smaller modules with even greater frequency range capabilities over the acoustic method. Telephones of the future may provide for this alternate coupling.

The enhanced capability "smart phone", illustrated and described herein, demonstrates how the PATSmethod can provide for the construction of a complex, multifunction apparatus in a single unit by using a microcontroller in conjunction with a single PATS Means. Notice that no individual or combined tone chips are used in this apparatus even though a variety of tone and voice signals (analog telephone signal types) are required. This apparatus also described a single phone line system, so a "hold" melody tone wasn't required. Had the system been multi line, the "hold" melody could have been produced by the same PATS Means, again negating the need for additional tone generation circuitry.

Another important ramification of the PATSmethod involves annunciator signals. It is the current practice of the local telephone company CO to annunciate a call to a subscriber by transmitting a high voltage ring signal, to cause a bell in the subscribers' phone to respond vigorously. This practice is archaic in light of current technology, but remains in use because of the problems of making a compatible switch over to other techniques.

In this invention, an annunciator signal means is described in conjunction with the "smart phone". This means can use the high voltage ring signal to initiate the process. A preferred annunciator method would be to provide analog annunciator tones to the called party, which could then be amplified using a part of the signal conditioning circuitry resident in the PATS Means (but not shown). The amplified signal could then be broadcast from the Speaker Means 75 described, in association with the Smart Phone.

This annunciation technique would be preferable, not just technically; it would also be aesthetically more pleasing because various tones, voice or music could be used as well. The PATS Means then becomes important, again, as a way of producing these analog annunciator signals without additional means.

While the signals could originate from the telephone company CO using PATS Means, they could just as well originate from the calling party telephone unit, taking advantage of the end-to-end signaling capacity inherent in the telephone company system. Callers having telephone units equipped with a PATS Means could then transmit any variety of annunciator signal previously stored in the PATS Means, or even store their own unique annunciator signals. This leads to annunciator signals which are not only pleasant, imaginative and fun, but which have the inherent capacity to provide a caller ID at the discretion of the caller. For instance, the caller's phone could be equipped, when using a PATS Means, to provide several different annunciator signals as might be appropriate to the occasion, or to signal a particular party residing in the called subscribees domain, or to identify themselves by transmitting a "signature ring".

It may be, however, that telephone company policy continues to dictate control over subscriber annunciator and ID methods. To this end it is important to outline how a PATS Means could be used in conjunction with a microcontroller by a telephone company as well. The CO could satisfy all the telephone signal production requirements and expand custom services to a subscriber by dedicating a PATS Means to each subscriber line.

It is assumed that anyone knowledgeable in the art will see the advantages in certain applications of using a PATS Means and replacing the microcontroller means with a personal computer or a Central Office computer. In addition, the PATS Means could be the magnetic read/write disk memory system in a PC (personal computer) modified to store analog signals, or even an optical read/write storage means.

As now can be readily appreciated, a universal analog telephone signal type production method, in accordance with the invention, can use a single means for the production of all varieties of telephone signal types ranging from data, to DTMF, to voice to simple tones. Frequency accuracy is upgraded to the accuracy of the source signal. The number of devices needed is reduced. Complexity is reduced. Versatility is increased. Miniaturization is enhanced and the number of external supporting components is reduced. Cost is reduced. It will thus be seen that the objects set forth above, and those made apparent from the preceding descriptions, are efficiently and effectively attained.

Although the terms telephone and telephone line have been used throughout this patent application to describe telephone related analog signal types and means, the terms should be construed as including radio telephones such as cellular systems and lines such as fiber optic, metallic and coax lines.

Although the present invention has been shown and described with respect to preferred embodiments, various changes and modifications which are obvious to a person skilled in the art to which the invention pertains, are deemed to lie within the spirit and scope of the invention.

I claim:

1. A method of producing one or more of a plurality of analog telephone signal types by storing and retrieving segments of analog telephone signals in a system comprising a signal-in conditioning circuit; a signal storage medium; a signal-out conditioning circuit; and a control logic circuit having the control functions of address, store, retrieve, and stop; comprising the steps of:

(a) selecting an analog telephone signal type to be stored;

(b) selecting an address location in said signal storage medium and allocating a memory storage area beginning with said address location for the selected signal type;

(c) selectively varying the amplification level of an analog telephone signal in said signal-in conditioning circuit based on said selected type of analog telephone signal to be stored and subsequently retrieved;

(d) storing a segment of said selectively varied analog telephone signal in said allocated memory storage area;

(e) repeating the steps a through d for selecting and storing additional analog signal types;

(f) receiving a request to retrieve said stored analog telephone signal segment;

(g) selecting said address corresponding to said allocated memory storage area of said stored analog signal segment to be retrieved;

(h) retrieving said stored analog signal from said allocated memory storage area and outputting said retrieved signal through said signal-out conditioning circuit; and (i) repeating steps f through h for retrieving additional analog signal types.

2. The method of claim 1 wherein step h further comprises the retrieving of said stored analog telephone signal segment iteratively.

3. The method of claim 1 wherein step h further comprises the retrieving of said stored analog telephone signal segment interruptedly.

4. The method of claim 1 step b wherein each memory location in said allocated memory storage area is designated by an address.

5. A compact module system for producing one or more of a plurality of analog telephone signal types by storing and retrieving a segment of analog telephone signals comprising:

a signal-in conditioning circuit selectively varying the amplification level of a selected analog telephone signal based on a selected type of analog telephone signal to be stored and subsequently retrieved;

a signal storage medium to store a segment of said selectively varied analog telephone signal;

a control logic circuit causing said segment of said selected varied analog telephone signal to be stored at an address in an allocated memory storage area of said signal storage medium; and a signal-out conditioning circuit to output stored signals;

wherein when a request to retrieve said stored analog telephone signal is received by said control logic circuit, said control logic circuit causes an address location to be selected that corresponds to the location of said stored analog telephone signal, and causes said stored analog telephone signal to be retrieved from said allocated memory storage area and causes said retrieved signal to be output through said signal-out conditioning circuit.

6. The system of claim 5 further comprising a plurality of electrical contact pads in electrical circuit relation to said signal-in conditioning circuit, said signal storage medium, said signal-out conditioning circuit, and said control logic circuit for providing external electrical coupling means for the control functions of address, store, retrieve, and stop, and analog input and output signals.

7. The system of claim 5 further comprising a replaceable battery means for powering said system and a light-emitting diode in electrical circuit relation with said replaceable battery means for providing visible ON and LOW BATTERY indications.

8. The system of claim 5 further comprising an acoustic transducer means.

9. The system of claim 8 wherein said acoustic transducer is a piezoelectric disk, resiliently mounted parallel to and separate from an inner face of said system by a narrow ring of an adhesive coated compliant material, circumferentially aligned with said piezoelectric disk and a small through hole in the mounting surface so as to form a cylindrical cavity, said cylindrical cavity being a resonant cavity which is acoustically larger than the cavity that would be created by using a solid spacer ring of the same dimension.

10. The system of claim 5 in operative relation to a microcontroller.

* * * * *